United States Patent
Johnson et al.

(10) Patent No.: US 9,102,784 B2
(45) Date of Patent: Aug. 11, 2015

(54) ACRYLIC ANTICRATER ADDITIVE FOR ELECTROCOATS

(75) Inventors: Jeffery W. Johnson, Rochester, MI (US); Michael E. Woodhouse, Farmington Hills, MI (US); Alan E Smith, Troy, MI (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 41 days.

(21) Appl. No.: 13/422,014

(22) Filed: Mar. 16, 2012

(65) Prior Publication Data
US 2013/0075269 A1  Mar. 28, 2013

Related U.S. Application Data

(60) Provisional application No. 61/453,570, filed on Mar. 17, 2011.

(51) Int. Cl.
| | |
|---|---|
| C08G 18/70 | (2006.01) |
| C25D 3/02 | (2006.01) |
| C08G 18/62 | (2006.01) |
| C08G 18/80 | (2006.01) |
| C09D 5/44 | (2006.01) |
| C09D 175/04 | (2006.01) |

(52) U.S. Cl.
CPC ............ C08G 18/70 (2013.01); C08G 18/6229 (2013.01); C08G 18/8064 (2013.01); C09D 5/4465 (2013.01); C09D 175/04 (2013.01); C25D 3/02 (2013.01)

(58) Field of Classification Search
CPC .......... C08F 28/00; C08F 28/02; C08F 28/04; C08G 18/2805; C08G 18/2815; C08G 18/281; C08G 18/285; C08G 18/2865; C08G 18/288; C08G 18/6225; C08G 18/06; C08G 18/28; C08G 18/04; C08G 18/702; C08G 18/715; C08G 18/3876; C25D 3/02

USPC ......................................................... 528/376
See application file for complete search history.

(56) References Cited

U.S. PATENT DOCUMENTS

| | | | | |
|---|---|---|---|---|
| 3,943,159 | A | * | 3/1976 | Quiring et al. ................... 560/33 |
| 4,032,698 | A | * | 6/1977 | Ashe .............................. 525/126 |
| 4,070,388 | A | * | 1/1978 | Jones ............................. 558/240 |
| 4,151,227 | A | * | 4/1979 | Simms ........................... 525/126 |
| 4,222,909 | A | * | 9/1980 | Brixius et al. ................. 525/535 |
| 4,933,232 | A | * | 6/1990 | Trout et al. ................. 428/301.1 |
| 5,051,464 | A | * | 9/1991 | Johnson et al. ............... 524/555 |
| 5,091,573 | A | | 2/1992 | Gross et al. |
| 5,098,537 | A | | 3/1992 | Klein et al. |
| 5,415,750 | A | | 5/1995 | Klein et al. |
| 6,093,298 | A | | 7/2000 | Kaylo et al. |
| 6,846,400 | B2 | * | 1/2005 | Klein et al. .................... 204/499 |
| 6,849,169 | B1 | | 2/2005 | Hoenig et al. |
| 2004/0003996 | A1 | * | 1/2004 | Anderson et al. ............. 204/499 |
| 2005/0154174 | A1 | | 7/2005 | Killeen et al. |
| 2007/0004895 | A1 | * | 1/2007 | Elsbernd et al. ................ 528/44 |
| 2007/0110902 | A1 | * | 5/2007 | Johnson et al. ............. 427/372.2 |
| 2008/0071056 | A1 | | 3/2008 | Borst |

FOREIGN PATENT DOCUMENTS

WO   95/19400 A2   7/1995

* cited by examiner

Primary Examiner — Mark Kaucher
Assistant Examiner — Kregg Brooks
(74) Attorney, Agent, or Firm — Ingrassia Fisher & Lorenz, P.C.

(57) ABSTRACT

The present disclosure is directed to an anticrater additive that is useful for providing a smooth surface to a cured layer of an electrocoating composition on a substrate. The anticrater additive comprises the reaction product of a polyisocyanate with an acrylic polymer having one isocyanate reactive functional group. The acrylic polymer can be an acrylic polymer that is terminated with a chain transfer agent. Also disclosed is an electrocoat composition comprising the anticrater additive and a substrate coated with a cured layer of the electrocoat composition.

15 Claims, No Drawings

ACRYLIC ANTICRATER ADDITIVE FOR ELECTROCOATS

CROSS-REFERENCE TO RELATED APPLICATION

This application claims priority under 35 USC §119 from U.S. Provisional Application Ser. No. 61/453,570, filed Mar. 17, 2011, the disclosure of which is incorporated by reference herein for all purposes as if fully set forth.

FIELD OF DISCLOSURE

The present disclosure is directed to electrocoat compositions and to an anticrater additive that can be added to an electrocoat composition wherein a layer of the dried and cured electrocoat composition has a low number of surface defects and can provide good adhesion to a dried and cured layer of a coating composition subsequently applied to the cured electrocoat composition.

BACKGROUND OF DISCLOSURE

Cathodic electrocoat compositions are very widely used in many industrial coating processes. The compositions provide high paint utilization rates, low environmental contamination and excellent corrosion resistance to metal substrates. Although surface coatings of excellent corrosion resistance can be achieved by the use of cathodic electrocoat compositions, a problem associated with this type of coating is the development of surface defects upon curing, particularly craters. Typically, impurities carried into the electrocoating bath with the substrate to be coated can cause such surface defects. Examples of such impurities can include, for example, particulates or incompatible oils, such as, for example, lubricating oil, anti-corrosion grease and joint sealing compounds.

A number of anticrater additives are known that can help to reduce such surface defects. For example, various water reducible polyesters, silane modified polyether amines, and polyvinyl ethers have been developed for use as anticrater additives. U.S. Pat. No. 6,849,169 describes the use of homopolymers or copolymers of 2-ethyl hexyl acrylate as an additive in aqueous cathodically depositable coatings to suppress the formation of surface defects in coating films.

Chung et al U.S. Pat. No. 5,356,960 issued Oct. 18, 1994 shows an anticrater additive that forms a crater free, smooth and even finish. However, when this additive is used in an electrocoating composition that is subsequently baked in an indirect gas-fired oven, the anticrater additive migrates very readily to the surface of the electrocoating composition during baking. Any primer compositions applied over such a surface containing polymeric melamine crosslinking agents adhere poorly to the electrocoat composition and hence, adhesion failure of any topcoat applied over the primer is readily evident.

An anticrater additive is needed that will not migrate to the surface of the deposited electrocoating composition during baking and should not adversely affect other properties such as the throwing power of the electrocoating bath, the curing of the deposited coating or the film properties of the resulting finish. There is a continuing need to improve the performance and adhesion characteristics of anticrater additives.

STATEMENT OF THE DISCLOSURE

The present disclosure relates to anticrater additives for electrocoat compositions. The anticrater additive comprises a copolymer that is the reaction product of an isocyanate containing compound with an isocyanate blocking compound, wherein the isocyanate containing compound has a structure according to the formula:

$$(OCN)_n\text{—X—N(H)—C(O)-G-R—S—Z};$$

wherein n is an integer from 1 to 6;

X is selected from the group consisting of aryl, alkyl, cycloalkyl groups and a combination thereof having up to 60 carbon atoms; wherein each of the aryl, alkyl, cycloalkyl groups can optionally be substituted with an isocyanurate group, an iminooxadiazine dione group, an allophanate group, a biuret group, a urea group, a urethane group or a uretidione group;

G is selected from the group consisting of O, N(R1) or a direct bond;

R is selected from the group consisting of aryl, alkyl, cycloalkyl groups and a combination thereof having up to 20 carbon atoms, and R can optionally contain amide, ester, ether, urethane and/or urea groups;

R1 is selected from the group consisting of H, aryl, alkyl, cycloalkyl groups and a combination thereof having up to 20 carbon atoms; and Z comprises polymerized (meth)acrylic monomers.

The present disclosure also relates to an electrocoat composition comprising the anticrater additive and to method for forming a cured electrocoating on the surface of a substrate.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein, "$M_n$" means "number average molecular weight" and "$M_w$" means weight average molecular weight. The units for any of the stated values or ranges is in grams per mole. The molecular weights are determined by gel permeation chromatography (GPC) using a polystyrene standard.

As used herein, the term (meth)acrylic can mean acrylic, methacrylic or a combination thereof. Also, the term (meth)acrylate can mean acrylate, methacrylate or a combination thereof.

As used herein, the phrase "isocyanate equivalents" means the total amount of isocyanate reactive functional groups that are present in a molecule, composition or mixture.

It has been found that an anticrater additive comprising or consisting essentially of the reaction product of a (meth)acrylic polymer having one isocyanate reactive functional group with an excess of one or more polyisocyanates, followed by the blocking of any remaining isocyanate groups on the polyisocyanate can be effective in an electrocoat composition to help minimize or prevent some surface defects. Particularly suitable are (meth)acrylic polymers comprising alkyl acrylates, alkyl methacrylates or a combination thereof that can be produced utilizing mercaptans as chain transfer agents. In some embodiments, the mercaptan chain transfer agents can include a functional group that is reactive with an isocyanate group. Suitable functional groups can include, for example, hydroxyl groups, amine groups and carboxylic acid groups.

In some embodiments, the anticrater additive comprises a copolymer having a structure according to formula (I):

Q-L-Z    (I);

wherein Q is the blocked polyisocyanate moiety; L is a linking group comprising the mercaptan group; and Z comprises or consists essentially of polymerized (meth)acrylic monomers.

In some embodiments, the anticrater additive having a structure according to formula (I) can be produced according to a method comprising or consisting essentially of the steps of;
(1) forming a (meth)acrylic polymer using a mercaptan chain transfer agent, wherein the mercaptan chain transfer agent comprises an isocyanate reactive group;
(2) reacting the isocyanate reactive group of the (meth)acrylic polymer with a polyisocyanate to form an isocyanate containing compound; and
(3) reacting the isocyanate containing compound with an isocyanate blocking agent.

In other embodiments, the anticrater additive can be formed according to a method comprising or consisting essentially of the steps;
(1) forming a reactant mixture comprising or consisting essentially of (meth)acrylate monomers and a mercaptan chain transfer agent wherein the mercaptan chain transfer agent comprises an isocyanate reactive group;
(2) polymerizing the reactant mixture to form a (meth)acrylic polymer comprising an isocyanate reactive functional group;
(3) reacting the (meth)acrylic polymer comprising an isocyanate reactive functional group with a polyisocyanate to form an isocyanate functional compound; and
(4) reacting the isocyanate functional compound with an isocyanate blocking agent to form the anticrater additive.

In still further embodiments, the anticrater additive can be formed according to a method comprising or consisting essentially of the steps;
(1) forming a first reaction mixture comprising or consisting essentially of (meth)acrylate monomers and a mercaptan chain transfer agent;
(2) polymerizing the first reaction mixture to form a (meth)acrylic polymer comprising an isocyanate reactive functional group;
(3) forming a second reaction mixture comprising or consisting essentially of the (meth)acrylic polymer comprising an isocyanate reactive functional group and an isocyanate blocking agent, wherein in the range of from 0.5 to 40 percent of the isocyanate reactive functional groups in the second reaction mixture are from the (meth)acrylic polymer comprising an isocyanate reactive functional group; and
(4) reacting the second reaction mixture with a polyisocyanate to form a mixture of the anticrater additive and a blocked isocyanate crosslinking agent.

In still further embodiments of the above method, in the range of from 25 to 35 percent of the isocyanate reactive functional groups in the second reaction mixture are from the (meth)acrylic polymer comprising an isocyanate reactive functional group.

In other embodiments, the anticrater additive can be formed according to a method comprising or consisting essentially of the following steps in any workable order;
(1) forming a first reaction mixture comprising or consisting essentially of (meth)acrylate monomers and a mercaptan chain transfer agent;
(2) polymerizing the first reaction mixture to form a (meth)acrylic polymer comprising an isocyanate reactive functional group;
(3) forming a partially blocked a polyisocyanate crosslinking agent, wherein in the range of from 0.1 percent to 20 percent of the isocyanate groups remain unblocked, based on the total amount of isocyanate groups present before blocking;
(4) forming a second reaction mixture comprising the (meth)acrylic polymer comprising an isocyanate reactive functional group and the partially blocked polyisocyanate crosslinking agent; and
(5) reacting the (meth)acrylic polymer comprising an isocyanate reactive functional group with the unblocked isocyanate groups of the partially blocked polyisocyanate crosslinking agent to form a mixture of the anticrater additive and a blocked isocyanate crosslinking agent.

In further embodiments of the above method, the partially blocked isocyanate can comprise in the range of from 0.5 percent to 10 percent of unblocked isocyanate groups and in still further embodiments, the partially blocked isocyanate can comprise in the range of from 1.0 percent to 8.0 percent of unblocked isocyanate groups.

In the above embodiments, the (meth)acrylic polymer comprising an isocyanate reactive functional group can have a structure according to formula (II);

HG'-R—S—Z    (II)

wherein G' is selected from the group consisting of —O—, —N(R$_1$)— and —O(O)C—; wherein R is selected from the group consisting of aryl, alkyl, cycloalkyl groups and a combination thereof having up to 20 carbon atoms, and R can optionally contain amide, ester, ether, urethane and/or urea groups;

R$_1$ is selected from the group consisting of H, aryl, alkyl, cycloalkyl groups and a combination thereof having up to 20 carbon atoms; and Z comprises or consists essentially of polymerized (meth)acrylic monomers.

In some embodiments, the polymerized (meth)acrylic monomers can form a linear polymer, and in other embodiments the polymerized (meth)acrylic monomers can form a branched polymer. As used herein, "branched polymer" means a polymer having one or more main backbones with one or more side chains attached to the main backbone. It can be possible for the side chain attached to the main backbone to have attached thereon, another side chain. This can also be known as a branch-upon-branch configuration and is to be considered as a branched polymer.

In some embodiments, the anticrater additive comprises a copolymer that is the reaction product of an isocyanate containing compound with an isocyanate blocking agent, wherein the isocyanate containing compound has a structure according to formula (III):

$$(OCN)_n—X—N(H)—C(O)\text{-}G\text{-}R—S—Z \qquad (III);$$

wherein n is an integer from 1 to 6;

X is selected from the group consisting of aryl, alkyl, cycloalkyl groups and a combination thereof having up to 60 carbon atoms; wherein each of the aryl, alkyl, cycloalkyl groups can optionally be substituted with an isocyanurate group, an iminooxadiazine dione group, an allophanate group, a biuret group, a urea group, a urethane group or a uretidione group;

G is selected from the group consisting of O, N($R_1$) or a direct bond;

R is selected from the group consisting of aryl, alkyl, cycloalkyl groups and a combination thereof having up to 20 carbon atoms, and R can optionally contain amide, ester, ether, urethane and/or urea groups;

$R_1$ is selected from the group consisting of H, aryl, alkyl, cycloalkyl groups and a combination thereof having up to 20 carbon atoms; and Z comprises or consists essentially of polymerized (meth) acrylic monomers.

The definitions of the X, R and $R_1$ groups in formulas (II) and (III) can have a lower limit for the number of carbon atoms. One of ordinary skill in the art would understand that if an aryl group is present, it could have a lower limit of 6 carbon atoms. If an alkyl is present for X, it could have a lower limit of 2 carbon atoms, while an alkyl for R and $R_1$ could have a lower limit of 1 carbon atom. A cycloalkyl group, if present, could have a minimum of 3 carbon atoms. When the X, R and/or $R_1$ groups contain a combination of aryl, alkyl and/or cycloalkyl, then the minimum number of carbon atoms will vary depending upon the combination. The combination of aryl and alkyl could have a lower limit of 7 carbon atoms, while an combination of alkyl and cycloalkyl could have a lower limit of 4 carbon atoms. Combinations of aryl and cycloalkyl would be rare, but, if present, could have a lower limit of 9 carbon atoms.

Suitable isocyanate containing compounds (III), wherein X contains both aryl and alkyl groups, can include, for example;

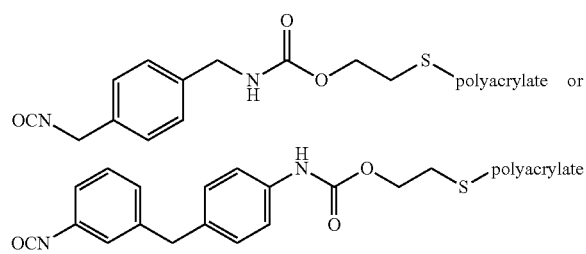

Typically, a mercaptan chain transfer agent can be used to produce the (meth)acrylic polymer (II) wherein the mercaptan chain transfer agent comprises a functional group that is reactive with an isocyanate group. In some embodiments, the mercaptan chain transfer agent can include, for example, hydroxyl mercaptans, mercaptan-terminated hydroxyamides, mercaptan carboxylic acids, primary or secondary amino mercaptans, mercaptan-terminated hydroxyl esters, mercaptan-terminated hydroxyl ethers, mercaptan-terminated hydroxyl urethanes, mercaptan-terminated hydroxyl ureas or a combination thereof. Specific examples of mercaptan chain transfer agents include, for example, 2-mercaptoethanol, 1-mercapto-2-propanol, 4-mercapto-1-butanol, 2-mercapto-n-methylethylamine, 2-mercapto ethylamine, mercaptoacetic acid, 3-mercaptopropionic acid, and 6-mercaptohexanoic acid.

In some embodiments, the (meth)acrylic polymer (II) can be produced by the polymerization of alkyl acrylates, alkyl methacrylates or a combination thereof, wherein the ester portion contains in the range of from 1 to 20 carbon atoms. In more specific embodiments, the alkyl acrylates and alkyl methacrylates can be chosen from, for example, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, pentyl acrylate, pentyl methacrylate, hexyl acrylate, hexyl methacrylate, 2-ethyl hexyl acrylate, 2-ethyl hexyl methacrylate or a combination thereof. In still further embodiments, a portion, up to 20 percent by weight, based on the total weight of all of the monomers of the (meth)acrylic polymer, can be vinyl aromatic monomers, vinyl ether monomers, vinyl acetate monomers, vinyl ester monomers, other ethylenically unsaturated monomers or a combination thereof. In a specific embodiment, the (meth) acrylic polymer (II) can be a copolymer of isobutyl acrylate and methyl acrylate.

The polymerization of the monomers using a chain transfer agent can be done using conditions that are well known in the art. Typical polymerization reactions can be done in organic or aqueous solvents using free radical initiators at temperatures in the range of from 50° C. to 200° C. The reactions can be run at atmospheric pressure or higher pressures as is known.

The (meth)acrylic polymer, HG'-R—S—Z (II) can, in most embodiments, have a single isocyanate reactive functional group, HG'-, that is able to react with an isocyanate group of the polyisocyanate. If the (meth)acrylic polymer (II) has more than one isocyanate reactive functional group, then the step of reacting with the polyisocyanate could potentially result in the condensation polymerization of the acrylic polymer (II) with the polyisocyanate, which can be undesirable. However, one of ordinary skill in the art would realize that such a multi-functional (meth)acrylic polymer could be reacted with a large excess (for example 2 to 100 equivalents of isocyanate for every one isocyanate reactive functional group) of polyisocyanate in order to minimize or avoid the formation of condensation polymers. Such an isocyanate containing compound could be used for forming the anticrater additive and is within the scope of the disclosure.

In some embodiments, the (meth)acrylic polymer (II) can have a weight average molecular weight in the range of from 1,000 to 10,000. In other embodiments, the weight average molecular weight of the (meth)acrylic polymer can be in the range of from 5,000 to 9,000, and in further embodiments, the weight average molecular weight can be in the range of from 5,500 to 7,500.

In some embodiments, the polydispersity (weight average molecular weight divided by the number average molecular weight) of the (meth)acrylic polymer (II) can be in the range of from 1.0 to 10.0. In other embodiments, the polydispersity of the (meth)acrylic polymer can be in the range of from 1.5 to 5.0, and, in other embodiments, the polydispersity of the acrylic polymer can be in the range of from 1.8 to 4.0.

Typical polyisocyanates that can be reacted with (meth) acrylic polymer (II) are those that are typically used in electrocoating compositions. Suitable examples can include aromatic and/or aliphatic polyisocyanates, for example, 2,4- toluene diisocyanate, 2,6-toluene diisocyanate, 4,4'-diphenylmethane diisocyanate, 2,2'-diphenylmethane diisocyanate, 2,4'-diphenylmethane diisocyanate, 4,4'-dicyclohexylmethane diisocyanate, 3,3'-dimethyl-4,4'-biphenyl diisocyanate, 1,4-benzene diisocyanate, cyclohexane-1,4-diisocyanate, 1,5-naphthalene diisocyanate, 1,6-hexamethylene diisocyanate, 4,6-xylene diisocyanate, isophorone diisocyanate, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, 3,3'-dimethyl-dicyclohexyl-methane 4,4'-diisocyanate, polyisocyanates having isocyanurate, uretidione, biuret, allophanate and/or iminooxadiazine dione structural units, adducts of 3 molecules of diisocyanates and 1 molecule of water, allophanates, trimers and biurets, for example, of hexamethylene diisocyanate, allophanates, trimers and biurets, for example, of isophorone diisocyanate and the isocyanurate of hexane diisocyanate. An isocyanate functional adduct can be used, such as the adduct of a polyisocyanate and a polyol or the adduct of a polyisocyanate and an amine or polyamine. Polyols, such as, trimethylol alkanes, particularly, trimethylol propane or ethane can be used to form an adduct. Combinations of any of the above can also be used. In some embodiments, the polyisocyanate can be a mixture of polyisocyanates, such as, for example, the commercially available PAPI® polyisocyanates from Dow, Midland, Mich. or the MONDUR® MR polyisocyanates from Bayer, Pittsburgh, Pa. In other embodiments, the polyisocyanates are derived from diphenylmethane diisocyanate.

Any of the commonly used isocyanate blocking agents that are known in the art can be used. Suitable isocyanate blocking agents have an isocyanate reactive functional group and can include, for example, an aliphatic alcohols having in the range of from 1 to 12 carbon atoms, hydroxyl functional monoalkyl polyethers, polyols, oximes, caprolactam, heterocyclic compounds or a combination thereof. Methods for forming blocked isocyanates using the blocking agents are also known and, in general, any of the known methods can be used. Suitable blocking agents can include, for example, methanol, ethanol, propanol, isopropanol, butanol, isobutanol, trimethylol propane, ethylene glycol monoalkyl ethers, diethylene glycol monobutyl ether, methylethyl ketoxime, dimethylpyrazole, triazole, imidazole, caprolactam and a combination thereof.

In some embodiments, the anticrater additive can be present in the electrocoating composition in the range of from 0.1 percent to 20 percent by weight, based on the weight of the film forming binder. In other embodiments, the anticrater additive can be used in the range of from 0.5 percent to 10 percent by weight based on the weight of the film forming binder. In further embodiments, the anticrater additive can be used at in the range of from 1.0 percent to 8.0 percent by weight based on the weight of the film forming binder.

Another embodiment of the disclosure relates to a cathodic electrocoat composition comprising the anticrater additive. The cathodic electrocoat composition can be an aqueous dispersion of a film forming binder wherein the film forming binder comprises a crosslinking agent and a crosslinkable component. As used herein, an aqueous dispersion is a two-phase system in which the film forming binder is in the dispersed phase and the continuous phase comprises water. The concentration of the film forming binder in the aqueous phase can be in the range of from 1 percent to 60 percent by weight, based on the total weight of the dispersion. In some embodiments, the crosslinkable component can comprise an epoxy amine resin that can be formed by the reaction product of an epoxy resin with an amine and the crosslinking agent can comprise a blocked polyisocyanate. The resulting epoxy amine resin can have reactive amine and hydroxyl groups.

The epoxy resin can have, on average, in the range of from 2 to 20 epoxy groups per molecule. In some embodiments, the epoxy resin can be the polyglycidyl ether of polyhydric phenols such as bisphenol A. In other embodiments, the epoxy resin can be the polyglycidyl ether of cyclic polyols. Suitable epoxy resins are known in the art and can be produced, for example, by the etherification of polyhydric phenols with epihalohydrin or dihalohydrin such as epichlorohydrin or dichlorohydrin in the presence of a base. Suitable polyhydric phenols can include, for example, 2,2-bis(4-hydroxyphenyl)propane, bis(4-hydroxyphenyl)methane, 1,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane and 1,5-dihydroxy naphthalene. Besides polyhydric phenols, other cyclic polyols can be used, such as, for example, 1,2-bis(hydroxymethyl)cyclohexane, 1,3-bis-(hydroxymethyl)cyclohexane, 1,4-bis-(hydroxymethyl)cyclohexane, 1,2 cyclohexane diol, 1,3 cyclohexane diol, 1,4-cyclohexane diol and hydrogenated bisphenol A. In some embodiments, the epoxy resins can have molecular weights in the range of from 200 to 5,000, and in other examples, within the range of 200 to 3,000, and in further examples, in the range of from 340 to 2,000.

The epoxy resin can be chain extended with any of the aforementioned polyhydric phenols or a combination of these phenols can be used. Also, the epoxy resins can be chain extended with a polyether or a polyester polyol which can enhance flow and coalescence. Typical useful chain extenders are polyols such as, for example, polycaprolactone diols and ethyoxylated bisphenol A such as SYNFAC 8009® alkoxylates available from Milliken Chemical Company.

The amines used to prepare the epoxy amine resin can be primary, secondary or tertiary amines or a combination thereof. Suitable amines can include monoamines, particularly hydroxyl containing amines such as alkanol amines, dialkanol amines, trialkanol amines, alkyl alkanol amines, arylalkanol amines and arylalkylalkanolamines containing from 2 to 18 carbon atoms in the aryl, alkyl and aryl chains. Typically useful amines can include, for example, ethanolamine, N-methyl-ethanolamine, diethanolamine, N-phenylethanolamine or a combination thereof.

In some embodiments, the epoxy amine resin can be neutralized with an acid to form a water soluble or water dispersible product. Suitable acids can include, for example, lactic acid, acetic acid, formic acid, dimethyol propionic acid, sulfamic acid, alkane sulfonic acids such as methane sulfonic acids, ethane sulfonic acid, propane sulfonic acid and a combination thereof.

The crosslinking agent can be a blocked polyisocyanate. Suitable polyisocyanates that can be used to form the blocked polyisocyanates can include any of the previously mentioned polyisocyanates. Upon heating the blocking agents can separate, thereby providing a reactive isocyanate group and crosslinking occurs.

Besides the binder resin described above, the electrocoating composition can also contain one or more pigments which can be incorporated into the composition in the form of a pigment paste. The pigment paste can be prepared by grinding or dispersing the pigments into a grinding vehicle and other optional ingredients such as the disclosed anticrater additive, wetting agents, surfactants and defoamers. Any of the pigment grinding vehicles that are well known in the art can be used. Typically, grinding is done using conventional equipment known in the art such as, for example, an Eiger mill, Dynomill or sand mill. After grinding, the particle size of the pigment should be as small as practical, generally, the particle size is about 6-8 using a Hegman grinding gauge.

Pigments which can be used include, for example, titanium dioxide, basic lead silicate, strontium chromate, carbon black, iron oxide, clay or a combination thereof. Pigments with high surface areas and oil absorbencies should be used judiciously because these can have an undesirable affect on coalescence and flow of the electrodeposited coating.

The pigment to binder weight ratio can be in the range of from 0.5:1 to 0.01:1, and in other embodiments the pigment to binder weight ratio can be in the range of from 0.4:1 to 0.1:1, and in further embodiments, the ratio can be in the range of from 0.3:1 to 0.11:1. Higher pigment to binder weight ratios have been found to adversely affect coalescence and flow.

The electrocoat compositions can contain optional ingredients such as catalysts, wetting agents, surfactants, plasticizers and defoamers. Suitable catalysts can include, for example, dialkyl tin carboxylates, such as, dibutyl tin dilaurate, dibutyl tin diacetate, dioctyl tin dicarboxylates and a combination thereof; bismuth catalysts, including, for example, bismuth oxide, bismuth trioxide, bismuth hydroxide, bismuth acetate, bismuth acetoacetonate, bismuth lactate, bismuth methane sulfate, bismuth dimethylpropionate, bismuth nitrate and a combination thereof. Combinations of any of the catalysts can also be used. Examples of surfactants and wetting agents include, for example, alkyl imidazolines such as those available from Ciba-Geigy Industrial Chemicals as AMINE® C, acetylenic alcohols available from Air Products and Chemicals as SURFYNOL® 104. Examples of useful plasticizers can be water immiscible materials such as ethylene or propylene oxide adducts of nonyl phenols or bisphenol A. These optional ingredients, when present, constitute in the range of from 0.1 to 20 percent by weight based on the total weight of the film forming binder.

Electrocoat compositions comprising the anticrater additive can be deposited onto a substrate and cured to provide a smooth durable layer of coating composition that has good adhesion to a subsequently applied and cured layer of a coating composition. This can provide a substrate, especially a motor vehicle substrate with a durable chip resistant finish.

Prior to deposition of a layer of the electrocoat composition comprising the anticrater additive onto a substrate, the substrate can be cleaned and/or treated in any manner typical for such substrates. For example, a metal substrate can be degreased and/or treated with a metal phosphate layer prior to application of a layer of an electrocoat composition.

Another embodiment of the current disclosure relates to a process for forming a layer of an electrocoat composition on the surface of a substrate comprising;
 a) providing a bath of an aqueous electrocoat composition;
 b) at least partially contacting the substrate with the electrocoat composition;
 c) passing an electrical current through the substrate and the bath to apply a layer of the electrocoat composition onto the surface of the substrate;
 d) removing the substrate from the electrocoat composition;
 e) rinsing the surface of the panel with deionized water; and
 f) heating the applied layer of electrocoat composition to at least partially cure the layer of electrocoat composition; wherein the aqueous electrocoat composition comprises the disclosed anticrater additive.

Typical electrocoating conditions can be 200-270 volts and an immersion time sufficient to obtain a cured coating of 10-40 microns. After electrodeposition, the coated substrate can be baked to a metal temperature of 149° C. to 182° C. for a sufficient time to cure the coating, typically about 20 minutes.

Curing of the applied layer of electrocoat composition can be done, in one embodiment, using direct heating of the applied layer of coating composition or, in another embodiment, by indirect heating of the applied layer of coating composition. Direct heating of the applied layer means heating of the substrate using flame as the heating source. In the case of direct heating, the combustion gases can directly contact the substrate to be cured. Indirect heating of the applied layer means heating of the applied layer using heat lamps, such as, for example, infra-red lamps, by resistive heating coils, or by warming air over a series of heat exchangers. With indirect heating methods, exhaust gases do not directly contact the substrate to be cured.

In one embodiment of the coating process, the substrate is at least partially immersed in the electrocoat composition. In a second embodiment, the entire substrate is immersed in the electrocoat composition.

Useful substrates for the electrocoat composition can include, for example, automobile bodies, any and all items manufactured and painted by automobile sub-suppliers, frame rails, trucks and truck bodies, beverage bodies, utility bodies, ready mix concrete delivery vehicle bodies, waste hauling vehicle bodies, fire and emergency vehicle bodies, as well as any potential attachments or components to such truck bodies, buses, farm and construction equipment, truck caps and covers, commercial trailers, consumer trailers, recreational vehicles, including for example, motor homes, campers, conversion vans, vans, pleasure vehicles, pleasure craft snow mobiles, all terrain vehicles, personal watercraft, motorcycles, boats, and aircraft. The substrate can further include, for example, industrial and commercial new construction and maintenance thereof; amusement park equipment, marine surfaces; outdoor structures, such as bridges, towers; coil coating; railroad cars; machinery; OEM tools; signage; sporting goods; and sporting equipment.

What is claimed is:
1. An electrocoating composition comprising a film-forming binder and an anticrater additive in an amount of from 0.1 to 20 wt. % of the film forming binder, the anticrater additive comprising a copolymer that is the reaction product of an isocyanate containing compound with an isocyanate blocking compound, wherein the isocyanate containing compound has a structure according to the formula:

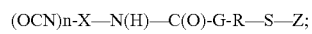

(OCN)n—X—N(H)—C(O)-G-R—S—Z;

wherein n is an integer from 1 to 6;
X is selected from the group consisting of aryl, alkyl, cycloalkyl groups and a combination thereof having up to 60 carbon atoms; wherein each of the aryl, alkyl, cycloalkyl groups can optionally be substituted with an isocyanurate group, an iminooxadiazine dione group, an allophanate group, a biuret group, a urea group, a urethane group or a uretidione group;
G is selected from the group consisting of N(R1) and a direct bond;
R is selected from the group consisting of aryl, alkyl, cycloalkyl groups and a combination thereof having up to 20 carbon atoms, and R can optionally contain amide, ester, ether, urethane and/or urea groups;

R1 is selected from the group consisting of H, aryl, alkyl, cycloalkyl groups and a combination thereof having up to 20 carbon atoms; and Z comprises polymerized (meth)acrylic monomers, wherein the polymerized (meth)acrylic monomers have a weight average molecular weight of from about 1,000 to about 10,000, wherein the isocyanate blocking compound is one or more selected from the group consisting of methanol, ethanol, propanol, isopropanol, butanol, isobutanol, trimethylolpropane, ethylene glycol monoalkyl ethers, and diethylene glycol monobutyl ether.

2. The anticrater additive of claim 1 wherein X comprises an aryl group or a combination of both aryl and alkyl groups.

3. The anticrater additive of claim 1 wherein the polymerized (meth)acrylic monomers are chosen from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, pentyl acrylate, pentyl methacrylate, hexyl acrylate, hexyl methacrylate, 2-ethyl hexyl acrylate, 2-ethyl hexyl methacrylate and a combination thereof.

4. The anticrater additive of claim 1 wherein the polymerized (meth)acrylic monomers are isobutyl acrylate and isobutyl methacrylate.

5. The anticrater additive of claim 1 wherein the polymerized (meth)acrylic monomers have the weight average molecular weight of from about 5,500 to about 7,500.

6. The anticrater additive of claim 1 wherein R is —CH$_2$CH$_2$—.

7. The anticrater additive of claim 1 wherein X is derived from diphenylmethane diisocyanate.

8. The anticrater additive of claim 1 wherein the anticrater additive is present in the electrocoating composition in the amount of from 0.5 to 10 wt. % of the film forming binder.

9. The anticrater additive of claim 1 wherein the anticrater additive is present in the electrocoating composition in the amount of from 1 to 8 wt. % of the film forming binder.

10. An electrocoat composition comprising a crosslinkable component, a crosslinking agent and an anticrater additive; wherein the crosslinkable component comprises an epoxy amine resin, the crosslinking agent comprises a blocked polyisocyanate; and the anticrater additive comprises a copolymer that is the reaction product of an isocyanate containing compound with an isocyanate blocking compound, wherein the isocyanate containing compound has a structure according to the formula:

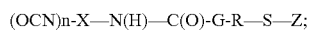
(OCN)n-X—N(H)—C(O)-G-R—S—Z;

wherein n is an integer from 1 to 6;

X is selected from the group consisting of aryl, alkyl, cycloalkyl groups and a combination thereof having up to 60 carbon atoms; wherein each of the aryl, alkyl, cycloalkyl groups can optionally be substituted with an isocyanurate group, an iminooxadiazine dione group, an allophanate group, a biuret group, a urea group, a urethane group or a uretidione group;

G is selected from the group consisting of N(R1) and a direct bond;

R is selected from the group consisting of aryl, alkyl, cycloalkyl groups and a combination thereof having up to 20 carbon atoms, and R can optionally contain amide, ester, ether, urethane and/or urea groups;

R1 is selected from the group consisting of H, aryl, alkyl, cycloalkyl groups and a combination thereof having up to 20 carbon atoms; and Z comprises polymerized (meth)acrylic monomers, wherein the polymerized (meth)acrylicmonomers have a weight average molecular weight of from about 1,000 to about 10,000, wherein the electrocoat composition comprises a film forming binder that comprises the crosslinkable component and the crosslinking agent, and wherein the anticrater additive is present in the electrocoating composition in an amount of from 0.1 to 20 wt. % of the film forming binder, and wherein the isocyanate blocking compound is one or more selected from the group consisting of methanol, ethanol, propanol, isopropanol, butanol, isobutanol, trimethylolpropane, ethylene glycol monoalkyl ethers, and diethylene glycol monobutyl ether.

11. The electrocoat composition of claim 10 wherein X comprises an aryl group or a combination of both aryl and alkyl groups.

12. The electrocoat composition of claim 10 wherein the polymerized (meth)acrylic monomers are chosen from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, t-butyl acrylate, t-butyl methacrylate, pentyl acrylate, pentyl methacrylate, hexyl acrylate, hexyl methacrylate, 2-ethyl hexyl acrylate, 2-ethyl hexyl methacrylate and a combination thereof.

13. The electrocoat composition of claim 10 wherein R is —CH$_2$CH$_2$—.

14. A process for forming a layer of an electrocoat composition on the surface of a substrate comprising;

a) providing a bath of an aqueous electrocoat composition;

b) at least partially contacting the substrate with the electrocoat composition;

c) passing an electrical current through the substrate and the bath to apply a layer of the electrocoat composition onto the surface of the substrate;

d) removing the substrate from the electrocoat composition;

e) rinsing the surface of the panel with deionized water f) heating the applied layer of electrocoat composition to at least partially cure the layer of electrocoat composition;

wherein the electrocoat composition comprises an anticrater additive comprises a copolymer that is the reaction product of an isocyanate containing compound with an isocyanate blocking compound, wherein the isocyanate containing compound has a structure according to the formula:

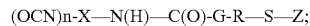
(OCN)n-X—N(H)—C(O)-G-R—S—Z;

wherein n is an integer from 1 to 6;

X is selected from the group consisting of aryl, alkyl, cycloalkyl groups and a combination thereof having up to 60 carbon atoms; wherein each of the aryl, alkyl, cycloalkyl groups can optionally be substituted with an isocyanurate group, an iminooxadiazine dione group, an allophanate group, abiuret group, a urea group, a urethane group or a uretidione group; G is selected from the group consisting of N(R1) and a direct bond;

R is selected from the group consisting of aryl, alkyl, cycloalkyl groups and a combination thereof having up to 20 carbon atoms, and R can optionally contain amide, ester, ether, urethane and/or urea groups;

R1 is selected from the group consisting of H, aryl, alkyl, cycloalkyl groups and a combination thereof having up to 20 carbon atoms; and Z comprises polymerized (meth)acrylic monomers, wherein the polymerized (meth)acrylic monomers have a weight average molecular weight of from about 1,000 to about 10,000, wherein the anticrater additive is present in the electrocoating composition in an amount of from 0.1 to 20 wt. % of a film forming binder of the electrocoating composition, and wherein the isocyanate blocking compound is one or more selected from the group consisting of methanol, ethanol, propanol, isopropanol, butanol, isobutanol, trimethylolpropane, ethylene glycol monoalkyl ethers, and diethylene glycol monobutyl ether.

15. The process of claim 14 further comprising the step of rinsing the applied layer of electrocoat composition prior to e) heating the applied layer of electrocoat composition to at least partially cure the layer of electrocoat composition.

* * * * *